(12) United States Patent
Jacobsen et al.

(10) Patent No.: US 7,811,956 B2
(45) Date of Patent: Oct. 12, 2010

(54) SUPPORTED OLEFIN POLYMERIZATION CATALYST

(75) Inventors: Grant Berent Jacobsen, Bouc Bel Air (FR); Brian Stephen Kimberley, Bouche du Rhone (FR); Sergio Mastroianni, Martigues (FR)

(73) Assignee: Ineos Europe Limited, Hampshire (GB)

( * ) Notice: Subject to any disclaimer, the term of this patent is extended or adjusted under 35 U.S.C. 154(b) by 0 days.

(21) Appl. No.: 12/216,323

(22) Filed: Jul. 2, 2008

(65) Prior Publication Data

US 2009/0043058 A1 Feb. 12, 2009

Related U.S. Application Data

(63) Continuation of application No. 10/539,573, filed as application No. PCT/GB03/05206 on Dec. 3, 2003, now abandoned.

(30) Foreign Application Priority Data

Dec. 17, 2002 (EP) .................................. 02358031

(51) Int. Cl.
*C08F 4/02* (2006.01)
*C08F 4/602* (2006.01)
*C08F 4/642* (2006.01)

(52) U.S. Cl. ........................ 502/110; 502/132; 502/152; 502/155; 526/148; 526/153; 526/161

(58) Field of Classification Search ................ 502/110, 502/132, 152, 155; 526/148, 153, 161
See application file for complete search history.

(56) References Cited

U.S. PATENT DOCUMENTS

| 5,006,500 A | 4/1991 | Chang |
| 6,475,945 B1 | 11/2002 | Carnahan et al. |
| 6,812,303 B1 * | 11/2004 | Matsushita et al. .......... 526/133 |
| 2003/0195306 A1 | 10/2003 | Tsuie et al. |

FOREIGN PATENT DOCUMENTS

| WO | WO 97/43323 | 11/1997 |
| WO | WO 00/15672 | 3/2000 |

* cited by examiner

*Primary Examiner*—Roberto Rábago
(74) *Attorney, Agent, or Firm*—Nixon & Vanderhye

(57) ABSTRACT

A supported catalyst system comprises (a) a dehydrated support material, (b) a transition metal compound, and (c) an activator and is characterised in that the support material has been pretreated with at least two different organoaluminum compounds prior to content with either or both the transition metal-compound or the activator. The prefer transition metal compound is a metallocene and the supported catalyst systems are suitable for the preparation of polymers having broad molecular weight distributions and improved melt strength.

13 Claims, No Drawings

SUPPORTED OLEFIN POLYMERIZATION CATALYST

RELATED APPLICATIONS

This application is a continuation of U.S. application Ser. No. 10/539,573, filed Jun. 17, 2005, abandoned, which is a §371 of PCT/GB2003/005206 filed Dec. 3, 2003, which claims priority of European Application No. 02358031.9, filed Dec. 17, 2002, the contents of all of which are incorporated herein by reference.

The present invention relates to supported catalysts suitable for the polymerisation of olefins and in particular to supported catalysts suitable for the preparation of polymers having broad molecular weight distributions and improved melt strengths.

In recent years there have been many advances in the production of polyolefin copolymers due to the introduction of transition metal compounds and in particular metallocene catalysts. Metallocene catalysts offer the advantage of generally higher activity than traditional Ziegler catalysts and are usually described as catalysts which are single-site in nature. Because of their single-site nature the polyolefin copolymers produced by metallocene catalysts are often quite uniform in their molecular structure. For example, in comparison to traditional Ziegler produced materials, they have relatively narrow molecular weight distributions (MWD) and narrow Short Chain Branching Distribution (SCBD). Although certain properties of metallocene products are enhanced by narrow MWD, difficulties are often encountered in the processing of these materials into useful articles and films relative to Ziegler produced materials. In addition, the uniform nature of the SCBD of metallocene produced materials does not readily permit certain structures to be obtained.

The use of these metal complex based olefin polymerisation catalysts is now well established. Typically the metallocene complex comprises a bis(cyclopentadienyl) zirconium complex for example bis(cyclopentadienyl) zirconium dichloride or bis(tetramethylcyclopentadienyl) zirconium dichloride. Examples of such complexes may be found in EP 129368, EP 206794, and EP 260130.

In such catalyst systems the metal complex is used in the presence of a suitable activator. The activators most suitably used with such metallocene complexes are aluminoxanes, most suitably methyl aluminoxane (MAO). Other suitable activators are boron compounds, in particular perfluorinated boron compounds.

More recently complexes having a single or mono cyclopentadienyl ring have been developed. Such complexes have been referred to as 'constrained geometry' complexes and examples of these complexes may be found in EP 416815 or EP 420436. In such complexes the metal atom eg. zirconium or titanium is in the highest oxidation state.

Other complexes however have been more recently developed in which the metal atom may be in a reduced oxidation state. Examples of both the bis (cyclopentadienyl) and mono (cyclopentadienyl) complexes have been described in WO 96/04290 and WO 95/00526 respectively.

The above monocyclopentadienyl metallocene complexes are utilised for polymerisation in the presence of a cocatalyst or activator. Typically activators are aluminoxanes, in particular methyl aluminoxane or compounds based on boron compounds. Examples of the latter are boranes, for example tris(pentafluorophenyl) borane, or borates such as trialkyl-substituted ammonium tetraphenyl- or tetrafluorophenyl-borates. Catalyst systems incorporating such borate activators are described in EP 561479, EP 418044 and EP 551277.

When used for the gas phase polymerisation of olefins, metallocene complexes may typically be supported for example on an inorganic oxide such as silica. Such supports may be typically dehydrated by calcining before use or may be pretreated with an organoaluminium compound to passivate the surface of the silica.

EP 495849 describes a silica supported catalyst system produced by reacting a mixture of triisobutylaluminium and trimethylaluminium with the water contained in an undehydrated support.

U.S. Pat. No. 5,834,393 describes in general terms the treatment of support materials with organomagnesium, organozinc, organoboron or organoaluminium compounds including mixtures thereof. The reference generally describes the use of both dehydrated and hydrated supports.

WO 91/05810 describes the treatment of undehydrated silica with mixtures of trimethylaluminium and trisisobutylaluminium to produce silica-aluminoxane products subsequently treated with Group IVB and/or Group VB metallocenes.

WO 97/43323 describes in example 7 the addition of triethylaluminium to a calcined silica in the presence of a borate activator. The resultant silica is then further treated with trihexylaluminium.

We have now surprisingly found that when dehydrated supports (ie. substantially free of water) are pretreated with more than one organoaluminium compound prior to contact with any other catalyst or cocatalyst/activator components the resultant supported catalysts may be used to prepare polymers having broad molecular weight distributions and improved melt strengths.

Thus according to the present invention there is provided a supported catalyst system comprising
   (a) a dehydrated support material,
   (b) a transition metal compound, and
   (c) an activator characterised in that said support material has been pretreated with at least two different organoaluminum compounds prior to contact with either or both the transition metal compound or the activator.

By dehydrated support material is meant support material substantially free of water.

Preferred support materials for use in the present invention are particulated solid support materials.

The support material may be any organic or inorganic inert solid. However particularly porous supports such as talc, inorganic oxides and resinous support materials such as polyolefins, which have well-known advantages in catalysis, are preferred. Suitable inorganic oxide materials which may be used include Group 2, 13, 14 or 15 metal oxides such as silica, alumina, silica-alumina and mixtures thereof.

Other inorganic oxides that may be employed either alone or in combination with the silica, alumina or silica-alumina are magnesia, titania or zirconia. Other suitable support materials may be employed such as finely divided polyolefins such as polyethylene.

Suitable volume average particle sizes of the support are from 1 to 1000 μm and preferably from 10 to 100 μm.

The most preferred support material for use with the supported catalysts according to the process of the present invention is silica.

Suitable silicas include Ineos ES70 and Davidson 948 silicas.

The support material may for example be subjected to a heat treatment in order to reduce the water content or the hydroxyl content of the support material. For example prior to its use the support material may be subjected to treatment at 100° C. to 1000° C. and preferably at 200 to 850° C. in an inert atmosphere under reduced pressure, for example, for 5 hrs.

Most preferably the support material is contacted with the organoaluminium compounds at room temperature in a suitable solvent, for example hexane.

Preferred organoaluminium compounds are trialkyl aluminium compounds containing from 1 to 20 carbons atoms in each alkyl group. Preferred trialkylaluminium compounds are trimethylaluminium, triethylaluminium, triisopropylaluminium and triisobutylaluminium.

In the preferred embodiment of the present invention the support material is contacted sequentially with the organoaluminium compounds.

The transition metal compound may be a compound of Groups IIIA to IIB of the Periodic Table of Elements (IUPAC Version). Examples of such transition metal compounds are traditional Ziegler Natta, vanadium and Phillips-type catalysts well known in the art.

The traditional Ziegler Natta catalysts include transition metal compounds from Groups IVA-VIA, in particular catalysts based on titanium compounds of formula MRx where M is titanium and R is halogen or a hydrocarbyloxy group and x is the oxidation state of the metal. Such conventional type catalysts include $TiCl_4$, $TiBr_4$, $Ti(OEt)_3Cl$, $Ti(OEt)_2Br_2$ and similar. Traditional Ziegler Natta catalysts are described in more detail in "Ziegler-Natta Catalysts and Polymerisation" by J. Boor, Academic Press, New York, 1979.

Vanadium based catalysts include vanadyl halides eg. $VCl_4$, and alkoxy halides and alkoxides such as $VOCl_3$, $VOCl_2(OBu)$, $VCl_3(OBu)$ and similar.

Conventional chromium catalyst compounds referred to as Phillips type catalysts include $CrO_3$, chromocene, silyl chromate and similar and are described in U.S. Pat. No. 4,124,532, U.S. Pat. No. 4,302,565.

Other conventional transition metal compounds are those based on magnesium/titanium electron donor complexes described for example in U.S. Pat. No. 4,302,565.

Other suitable transition metal compounds are those based on the late transition metals (LTM) of Group VIII for example compounds containing iron, nickel, manganese, ruthenium, cobalt or palladium metals. Examples of such compounds are described in WO 98/27124 and WO 99/12981 and may be illustrated by [2,6-diacetylpyridinebis(2,6-diisopropylanil) $FeCl_2$], 2.6-diacetylpyridinebis(2,4,6-trimethylanil) $FeCl_2$ and [2,6-diacetylpyridinebis(2,6-diisopropylanil)$CoCl_2$].

Other transition metal compounds include derivatives of Group IIIA, IVA or Lanthanide metals which are in the +2, +3 or +4 formal oxidation state. Preferred compounds include metal complexes containing from 1 to 3 anionic or neutral ligand groups which may be cyclic or non-cyclic delocalized π-bonded anionic ligand groups. Examples of such π-bonded anionic ligand groups are conjugated or non-conjugated, cyclic or non-cyclic dienyl groups, allyl groups, boratabenzene groups, phosphole and arene groups. By the term π-bonded is meant that the ligand group is bonded to the metal by a sharing of electrons from a partially delocalised π-bond.

Each atom in the delocalized π-bonded group may independently be substituted with a radical selected from the group consisting of hydrogen, halogen, hydrocarbyl, halohydrocarbyl, hydrocarbyl, substituted metalloid radicals wherein the metalloid is selected from Group IVB of the Periodic Table. Included in the term "hydrocarbyl" are C1-C20 straight, branched and cyclic alkyl radicals, C6-C20 aromatic radicals, etc. In addition two or more such radicals may together form a fused ring system or they may form a metallocycle with the metal.

Examples of suitable anionic, delocalised π-bonded groups include cyclopentadienyl, indenyl, fluorenyl, tetrahydroindenyl, tetrahydrofluorenyl, octahydrofluorenyl, etc. as well as phospholes and boratabenzene groups.

Phospholes are anionic ligands that are phosphorus containing analogues to the cyclopentadienyl groups. They are known in the art and described in WO 98/50392.

The boratabenzenes are anionic ligands that are boron containing analogues to benzene. They are known in the art and are described in Organometallics, 14, 1, 471-480 (1995).

The preferred polymerisation catalyst of the present invention is a bulky ligand compound also referred to as a metallocene complex containing at least one of the aforementioned delocalized π-bonded group, in particular cyclopentadienyl ligands. Such metallocene complexes are those based on Group IVA metals for example titanium, zirconium and hafnium.

Metallocene complexes may be represented by the general formula:

$$L_xMQ_n$$

where L is a cyclopentadienyl ligand, M is a Group IVA metal, Q is a leaving group and x and n are dependent upon the oxidation state of the metal.

Typically the Group IVA metal is titanium, zirconium or hafnium, x is either 1 or 2 and typical leaving groups include halogen or hydrocarbyl. The cyclopentadienyl ligands may be substituted for example by alkyl or alkenyl groups or may comprise a fused ring system such as indenyl or fluorenyl.

Examples of suitable metallocene complexes are disclosed in EP 129368 and EP 206794. Such complexes may be unbridged eg. bis(cyclopentadienyl) zirconium dichloride, bis(pentamethyl)cyclopentadienyl dichloride, or may be bridged eg. ethylene bis(indenyl) zirconium dichloride or dimethylsilyl(indenyl) zirconium dichloride.

Other suitable bis(cyclopentadienyl) metallocene complexes are those bis(cyclopentadienyl) diene complexes described in WO 96/04290. Examples of such complexes are bis(cyclopentadienyl) zirconium (2.3-dimethyl-1,3-butadiene) and ethylene bis(indenyl) zirconium 1,4-diphenyl butadiene.

Examples of monocyclopentadienyl or substituted monocyclopentadienyl complexes suitable for use in the present invention are described in EP 416815, EP 418044, EP 420436 and EP 551277. Suitable complexes may be represented by the general formula:

$$CpMX_n$$

wherein Cp is a single cyclopentadienyl or substituted cyclopentadienyl group optionally covalently bonded to M through a substituent, M is a Group VIA metal bound in a $\eta^5$ bonding mode to the cyclopentadienyl or substituted cyclopentadienyl group, X each occurrence is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms or optionally one X together with Cp forms a metallocycle with M and n is dependent upon the valency of the metal.

Particularly preferred monocyclopentadienyl complexes have the formula:

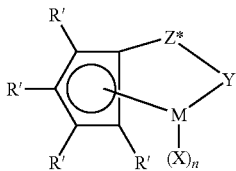

wherein:
R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms, Y is —O—, —S—, —NR*—, —PR*—, M is hafnium, titanium or zirconium, Z* is SiR*$_2$, CR*$_2$, SiR*$_2$SIR*$_2$, CR*$_2$CR*$_2$, CR*=CR*, CR*$_2$SIR*$_2$, or GeR*$_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system, and n is 1 or 2 depending on the valence of M.

Examples of suitable monocyclopentadienyl complexes are (tert-butylamido) dimethyl (tetramethyl-$\eta^5$-cyclopentadienyl) silanetitanium dichloride and (2-methoxyphenylamido) dimethyl (tetramethyl-$\eta^5$-cyclopentadienyl) silanetitanium dichloride.

Other suitable monocyclopentadienyl complexes are those comprising phosphinimine ligands described in WO 99/40125, WO 00/05237, WO 00/05238 and WO00/32653. A typical examples of such a complex is cyclopentadienyl titanium [tri (tertiary butyl) phosphinimine] dichloride.

Another type of polymerisation catalyst suitable for use in the present invention are monocyclopentadienyl complexes comprising heteroallyl moieties such as zirconium (cyclopentadienyl) tris (diethylcarbamates) as described in U.S. Pat. No. 5,527,752 and WO 99/61486.

Particularly preferred metallocene complexes for use in the preparation of the supported catalysts of the present invention may be represented by the general formula:

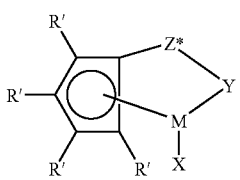

wherein:—
R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is a neutral $\eta^4$ bonded diene group having up to 30 non-hydrogen atoms, which forms a $\pi$-complex with M;

Y is —O—, —S—, —NR*—, —PR*—,

M is titanium or zirconium in the +2 formal oxidation state;

Z* is SiR*$_2$, CR*$_2$, SiR*$_2$SIR*$_2$, CR*$_2$CR*$_2$, CR*=CR*, CR*$_2$SIR*$_2$, or GeR*$_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system.

Examples of suitable X groups include s-trans-$\eta^4$-1,4-diphenyl-1,3-butadiene, s-trans-$\eta^4$-3-methyl-1,3-pentadiene; s-trans-$\eta^4$-2,4-hexadiene; s-trans-$\eta^4$-1,3-pentadiene; s-trans-$\theta^4$-1,4-ditolyl-1,3-butadiene; s-trans-$\eta^4$-1,4-bis(trimethylsilyl)-1,3-butadiene; s-cis-$\eta^4$-3-methyl-1,3-pentadiene; s-cis-$\eta^4$-1,4-dibenzyl-1,3-butadiene; s-cis-$\eta^4$-1,3-pentadiene; s-cis-$\eta^4$-1,4-bis(trimethylsilyl)-1,3-butadiene, said s-cis diene group forming a $\pi$-complex as defined herein with the metal.

Most preferably R' is hydrogen, methyl, ethyl, propyl, butyl, pentyl, hexyl, benzyl, or phenyl or 2 R' groups (except hydrogen) are linked together, the entire $C_5R'_4$ group thereby being, for example, an indenyl, tetrahydroindenyl, fluorenyl, terahydrofluorenyl, or octahydrofluorenyl group.

Highly preferred Y groups are nitrogen or phosphorus containing groups containing a group corresponding to the formula —N(R")— or —P(R")— wherein R" is $C_{1-10}$ hydrocarbyl.

Most preferred complexes are amidosilane—or amidoalkanediyl complexes.

Most preferred complexes are those wherein M is titanium.

Specific complexes suitable for use in the preparation of the supported catalysts of the present invention are those disclosed in WO 95/00526 and are incorporated herein by reference.

A particularly preferred complex for use in the preparation of the supported catalysts of the present invention is (t-butylamido) (tetramethyl-$\eta^5$-cyclopentadienyl) dimethyl silanetitanium-$\eta^4$-1.3-pentadiene.

Suitable activators for use with the supports of the present invention include aluminoxanes and organoboron compounds for example boranes.

Aluminoxanes are well known as activators for metallocene complexes. Suitable aluminoxanes, for use in the present invention, include polymeric or oligomeric aluminoxanes in particular methyl aluminoxane (MAO).

The aluminoxanes suitable for use in the present invention may be commercially available materials or may be such commercially available material that has been dried under vacuum prior to its use for the preparation of the supported catalyst compositions.

Preferred organoboron compounds are triarylboron compounds, in particular perfluorinated triarylboron compounds.

The most preferred organoboron compound is trispentafluorophenyl) borane (FAB).

A particularly preferred activator component comprises an organoboron compound and an organoaluminium compound.

The organoaluminium compounds are as described above. The preferred organoaluminium compounds are triethylaluminium or triisobutylaluminium.

Thus according to another aspect of the present invention there is provided a supported catalyst system comprising
(a) a dehydrated support material,
(b) a transition metal compound, and
(c) an activator comprising (i) an organoaluminium compound and (ii) an organoboron compound, characterised in that said support material has been pretreated with at least two different organoaluminum compounds prior to contact with either or both the transition metal compound or the activator.

For this particular aspect of the present invention the combination of a triarylboron compound for example tris(pentafluorophenyl) borane and a trialkylaluminium compound for example triethylaluminium is preferred as activator.

The ratio of boron/transition metal in this aspect of the present invention is typically in the range 0.1 to 10 and most preferably in the range 1 to 4.

Other compounds suitable as activators are compounds which comprise a cation and an anion. The cation is typically a Bronsted acid capable of donating a proton and the anion is typically a compatible non-coordinating bulky species capable of stabilizing the cation.

Such activators may be represented by the formula:

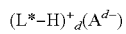

wherein
L* is a neutral Lewis base
(L*–H)$^+_d$ is a Bronsted acid
A$^{d-}$ is a non-coordinating compatible anion having a charge of d$^-$, and
d is an integer from 1 to 3.

The cation of the ionic compound may be selected from the group consisting of acidic cations, carbonium cations, silylium cations, oxonium cations, organometallic cations and cationic oxidizing agents.

Suitably preferred cations include trihydrocarbyl substituted ammonium cations eg. triethylammonium, tripropylammonium, tri(n-butyl)ammonium and similar. Also suitable are N,N-dialkylanilinium cations such as N,N-dimethylanilinium cations.

The preferred ionic compounds used as activators are those wherein the cation of the ionic compound comprises a hydrocarbyl substituted ammonium salt and the anion comprises an aryl substituted borate.

Typical borates suitable as ionic compounds include:
triethylammonium tetraphenylborate
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
trimethylammonium tetrakis(pentafluorophenyl) borate,
triethylammonium tetrakis(pentafluorophenyl) borate,
tripropylammonium tetrakis(pentafluorophenyl) borate,
tri(n-butyl)ammonium tetrakis(pentafluorophenyl) borate,
N,N-dimethylanilinium tetrakis(pentafluorophenyl) borate,
N,N-diethylanilinium tetrakis(pentafluorophenyl) borate.

The most preferred activators of this type are those wherein the anion comprises a boron atom.

A preferred type of activator suitable for use with the metallocene complexes of the present invention comprise ionic compounds comprising a cation and an anion wherein the anion has at least one substituent comprising a moiety having an active hydrogen.

Suitable activators of this type are described in WO 98/27119 the relevant portions of which are incorporated herein by reference.

Examples of this type of anion include:
triphenyl(hydroxyphenyl) borate
tri (p-tolyl)(hydroxyphenyl) borate
tris (pentafluorophenyl)(hydroxyphenyl) borate
tris (pentafluorophenyl)(4-hydroxyphenyl) borate Examples of suitable cations for this type of activator include triethylammonium, triisopropylammonium, diethylmethylammonium, dibutylethylammonium and similar.

Particularly suitable are those cations having longer alkyl chains such as dihexyldecylmethylammonium, dioctadecylmethylammonium, ditetradecylmethylammonium, bis(hydrogentated tallow alkyl) methylammonium and similar.

Particular preferred activators of this type are alkylammonium tris(pentafluorophenyl) 4-(hydroxyphenyl) borates. A particularly preferred activator is bis(hydrogenated tallow alkyl) methyl ammonium tris (pentafluorophenyl) (4-hydroxyphenyl) borate.

With respect to this type of activator, a preferred compound is the reaction product of an alkylammonium tris(pentaflurophenyl)4-(hydroxyphenyl) borate and an organometallic compound, for example triethylaluminium.

The supported catalyst systems of the present invention are most suitable for operation in processes which typically employ supported polymerisation catalysts.

The supported catalysts of the present invention may be suitable for the polymerisation of olefin monomers selected from (a) ethylene, (b) propylene (c) mixtures of ethylene and propylene and (d) mixtures of (a), (b) or (c) with one or more other alpha-olefins.

Thus according to another aspect of the present invention there is provided a process for the polymerisation of olefin monomers selected from (a) ethylene, (b) propylene (c) mixtures of ethylene and propylene and (d) mixtures of (a), (b) or (c) with one or more other alpha-olefins, said process performed in the presence of a supported catalyst system as hereinbefore described.

The supported catalyst systems of the present invention are however most suitable for use in slurry or gas phase processes.

A slurry process typically uses an inert hydrocarbon diluent and temperatures from about 0° C. up to a temperature just below the temperature at which the resulting polymer becomes substantially soluble in the inert polymerisation medium. Suitable diluents include toluene or alkanes such as hexane, propane or isobutane. Preferred temperatures are from about 30° C. up to about 200° C. but preferably from about 6° C. to 100° C. Loop reactors are widely used in slurry polymerisation processes.

Gas phase processes for the polymerisation of olefins, especially for the homopolymerisation and the copolymerisation of ethylene and α-olefins for example 1-butene, 1-hexene, 4-methyl-1-pentene are well known in the art.

Typical operating conditions for the gas phase are from 20° C. to 100° C. and most preferably from 40° C. to 85° C. with pressures from subatmospheric to 100 bar.

Particularly preferred gas phase processes are those operating in a fluidised bed. Examples of such processes are described in EP 89691 and EP 699213 the latter being a particularly preferred process for use with the supported catalysts of the present invention.

Particularly preferred polymerisation processes are those comprising the polymerisation of ethylene or the copolymerisation of ethylene and α-olefins having from 3 to 10 carbon atoms.

Thus according to another aspect of the present invention there is provided a process for the polymerisation of ethylene or the copolymerisation of ethylene and α-olefins having from 3 to 10 carbon atoms, said process performed under polymerisation conditions in the present of a supported catalyst system as hereinbefore described.

The preferred α-olefins are 1-butene, 1-hexene, 4-methyl-1-pentene and 1-octene.

The supported catalysts prepared according to the present invention may also be suitable for the preparation of other polymers for example polypropylene, polystyrene, etc.

It has been surprisingly found that the supported catalyst systems described herein may be used to prepare copolymers having a broad molecular weight distribution as well as improved melt strengths.

Copolymers may be prepared which exhibit a molecular weight distribution (Mw/Mn) of >2 and preferably >3.

The copolymers also exhibit melt strength values (16 Mpa) in the range 3-12 cN and preferably in the range 3-9 cN.

The copolymers are preferably prepared by use of a supported metallocene catalyst system as hereinbefore described.

Thus according to another aspect of the present invention there is provided a process for the preparation of copolymers of ethylene and alpha-olefins having (a) melt strength in the range 3-12 cN, and (b) a Mw/Mn of >2.

said process comprising contacting ethylene and one or more alpha-olefins in the presence of a supported metallocene catalyst system as hereinbefore described.

The preferred supported catalyst system for this aspect of the present invention is that wherein the transition metal compound is a monocyclopentadienyl metallocene complex as hereinbefore described.

The preferred process for the preparation of such copolymers is a gas phase process.

The present invention also encompasses a dehydrated catalyst support material characterised in that the support material has been treated with at least two different organoaluminium compounds prior to the addition of further catalytic components.

The process of the present invention will now be illustrated by reference to the following examples.

EXAMPLES

| Abbreviations used | |
|---|---|
| FAB | trispentafluorophenylborane |
| TEA | triethylaluminium |
| TiBA | trisobutylaluminum |
| Ionic Activator A | $[N(H)Me(C_{18}H_{37})_2][B(C_6F_5)_3(p\text{-}OHC_6H_4)]$ |
| Complex A | (t-butylamido) (tetramethyl-$\eta^5$-cyclopentadienyl) dimethyl silanetitanium-$\eta^4$-1,3-pentadiene |

All catalyst preparation steps were performed in a inert atmosphere filled glove-box using standard Schlenk and cannulae techniques.

Example 1

To 5 g of Ineos ES70 silica (previously calcined at 500° C. for 5 hours under nitrogen, pore volume 1.55 ml/g) was added 2.04 ml of an hexane solution of triethylaluminium (TEA), 0.98 mol/l, (0.4 mmol Al/g silica) followed by the addition of 1.58 ml of an hexane solution of TiBA, 0.95 mol/l (0.3 mmol Al/g silica). The mixture was allowed to react for 2 hours then dried under vacuum.

To 0.77 g of trispentafluorophenylborane (1.5 mmol) was added 5 ml of toluene. 1.53 ml of a solution of triethylaluminum in hexane, 1 mol/l, were then added and the solution was stirred for 30 minutes.

The trispentafluorophenylalane above was added to the TEA-TiBA treated silica (at pore volume) and then heated at 85° C. for 2 hours, followed by drying at the same temperature 1.4 ml of Complex A solution in heptane (9.17% wt) was then slowly added (15 min) and manually agitated until no lumps were visible. After one hour holding the catalyst was then dried under vacuum.

[Ti]=66 µmol/g final catalyst; [Al]=0.908 mmol/g final catalyst

Polymerisation Data

A 2.5 l double jacketed thermostatic stainless steel autoclave was purged with nitrogen at 70° C. for at least one hour. PE pellets previously dried under vacuum at 80° C. for 12 hours were introduced and the reactor was then purged three times with nitrogen (7 bar to atmospheric pressure). ~0.13 g of TEA treated silica (1.5 mmol TEA/g) was added under pressure and allowed to scavenge impurities for at least 15 minutes under agitation. The gas phase was then composed (addition of ethylene, 1-hexene and hydrogen) and a mixture of supported catalyst (~0.1 g) and silica/EA (~0.1 g) was injected. A constant pressure of ethylene and a constant pressure ratio of ethylene/co-monomer were maintained during the run. The run was terminated by venting the reactor and then purging the reactor 3 times with nitrogen. The PE powder produced during the run was then separated from the PE seed bed by simple sieving. Typical conditions are as follows:

200 g of PE pellets as bed

T=70° C.

PC2=6.5 Bar.

PC6/PC2=0.0048

SiO2/TEA impregnated used as scavenger.

H2 added during the gas phase composition: 150 ml

Catalyst Quantity: 200 mg

Polymerisation Time=60 min

At the end of the polymerisation reaction, polymer produced separated from polymer bed by simple sieving was obtained having the following properties:

| | |
|---|---|
| Activity: | 24 g/ghb |
| MI (2.16 kg) | 0.81 g/10 min |
| Density | 0.926 g/ml |

-continued

| | |
|---|---|
| Mn | 19300 g/mol |
| Mw | 114125 g/mol |
| Mw/Mn | 5.9 |
| Melt strength(16 Mpa) | 7.6 (cN) |

Example 2

To 10 g of Grace 948 silica (previously calcined at 250° C. for 5 hours under nitrogen) was added 7.8 ml of an hexane solution of triethylaluminium (TEA), 1.027 mol/l, (0.8 mmol Al/g silica) followed by the addition of 8.4 ml of an hexane solution of triisobutylaluminium (TiBA), 0.952 mol/l (0.8 mmol Al/g silica). The mixture was allowed to react for 2 hours then the silica was decanted, washed three times and dried under vacuum.

[Al]1.35 mmol/g (ICP Measurement)

1.48 mls of a solution of ionic activator A (11.1 wt % in toluene) was reacted with 0.25 ml TEA in toluene (0.25 mol/l) (molar ratio Al/B=0.5). 4 g of the above passivated silica was slowly impregnated (15 min) with the ionic actiator solution and manually agitated until no lumps were visible followed by 30 min holding.

70 ml of Complex A solution in heptane (9.17% wt) was then slowly added (15 min) and manually agitated until no lumps were visible followed by 30 min holding. 10 ml of hexane was the added and the suspension was stirred for 15 minutes. The catalyst was washed 3 times with 20 ml of essence and then dried under vacuum.

[Ti]=31 μmol/g; [Al]=1.28 mmol/g

Polymerisation Data

The same procedure as described above for Example 1 was used.

Run Conditions 116 g of PE pellets as bed

T=70° C.

PC2=6.5 Bar.

% vol C6/PC2=0.74

SiO2/TEA impregnated used as scavenger.

H2 added during the gas phase composition: 50 ml

Catalyst Quantity: 103 mg

Polymerisation Time=90 min

At the end of the polymerisation reaction, polymer produced (77 g) separated from polymer bed by simple sieving

| | |
|---|---|
| Activity: | 88 g/ghb |
| MI (2.16 kg) | 1.02 g/10 min |
| MI (21.6 kg) | 25.02 |
| MFR | 25 |
| Density | 0.917 g/ml |
| Mn | 37000 g/mol |
| Mw | 114000 g/mol |
| Mw/Mn | 3.1 |
| Melt strength (16 Mpa) | 3.6 (cN) |

Product characteristics were determined using the following analytical procedures:

Melt Flow Rate (2.16 kg)

The melt flow rate (MFR) of the polymers was measured under conditions which conform to ISO 1133 (1991) and BS 2782:PART 720A:1979 procedures. The weight of polymer extruded through a die of 2.095 mm diameter, at a temperature of 190° C., during a 600 second time period and under a standard load of 2.16 kg is recorded.

Molecular Structure Characterisation

Various techniques (eg $^{13}$C NMR, GPC/LALLS, GPC/intrinsic viscosity, GPC/on-line viscometry and rheological flow activation energy, etc) have been developed to indicate the presence of long chain branching in polymers.

Molecular Weight Distribution ($M_w/M_n$)

Molecular weight distribution and associated averages, were determined by Gel Permeation Chromatography using a Waters GPCV 2000. The Millennium version 3.05.01 software supplied by Waters was used for data treatment. The solvent used was 1,2,4 Trichlorobenzene at 150° C., stabilised with 0.05% BHT. The nominal flow rate was 1 ml/min. Solutions of concentration around 0.1% w/w were prepared at 150° C. for 2 hours on a hot plate, and the nominal injection volume was set at 217.5 ml. 2 Shodex AT806M/S and 1 Waters HT2 columns were used with a plate count (at half height) of typically 28,000. The system was calibrated using 12 polystyrene standards supplied by Polymer Laboratories.

Apparent molecular weight distribution and associated averages, uncorrected for long chain branching, were determined using the differential refractometer detector alone. Molecular weight of Ps standards were converted to polyethylene molecular weights using the Mark Houwink parameters $K_{ps}=1.75\times10^{-4}$ dl/g, $\square_{ps}=0.67$,
$K_{pe}=4.1\times10^{-4}$ dl/g, $\square_{pe}=0.706$ [Polymer Handbook, J. Bandrup and E. H. Immergut, $3^{rd}$ Edition].

This calibration has been checked against the NIST certified polyethylene SRM1475, the values obtained being 54,100 g/mol for $M_w$ and 17,300 g/mol for $M_n$.

Melt Strength

The melt strength of the polymer is measured at 190° C., using a Göttfert Rheotens extensional rheometer in conjunction with a Rosand RH 7 Capillary Rheometer. This is achieved by extruding the polymer at a constant pressure (P) through a die of 1.5 mm diameter and 30 mm in length, with a 90° entry angle. Once a given extrusion pressure is selected, the piston of the capillary rheometer will travel through its 15 mm diameter barrel at a speed that is sufficient to maintain that pressure constant. The nominal wall shear rate ($\dot{\gamma}$) for a given extrusion pressure can then be computed for the polymer at the selected pressure using the constant pressure ratio system of the rheometer.

The extrudate is drawn with a pair of gear wheels at an accelerating speed (V). The acceleration ranges from 0.12 to 1.2 cm/s$^2$ depending on the flow properties of the polymer under test. The drawing force (F) experienced by the extrudate is measured with a transducer and recorded on a chart recorder together with the drawing speed. The maximum force at break is defined as melt strength (MS) at a constant extrusion pressure (P) or at its corresponding extrusion rate ($\dot{\gamma}$). Three or four extrusion pressures (6, 8, 12, 16 MPa) are typically selected for each polymer depending on its flow properties. For each extrusion pressure, a minimum of 3 MS measurements is performed and an average MS value is then obtained.

The derivative function of the extrusion pressure dependent melt strength, $\delta(MS)/\delta(P)$ for each polymer is computed from the slope (by a least square line fitting) of the plot of the average MS against pressure. The mean melt strength at an extrusion pressure of 16 MPa, MS (16 MPa), can be computed from the plot.

The invention claimed is:

1. A method for preparing a supported catalyst composition system comprising, in order,
    a) dehydrating a support material,
    b) pretreating said dehydrated support material sequentially with at least two different and separate organoaluminum compounds in the same solvent and without any intermediate step of solvent removal to form a reaction mixture of said dehydrated support material and said at least two organoaluminum compounds; and
    c) thereafter contacting said pretreated dehydrated support material with a transition metal compound and an activator.

2. The method of claim 1, wherein the support material is a particulated solid material.

3. The method of claim 2, wherein the support material is silica.

4. The method of claim 1, 2, or 3, wherein the organoaluminum compounds are trialkylaluminum compounds.

5. The method of claim 1, wherein the transition metal compound is a metallocene.

6. The method of claim 5, wherein the metallocene has the formula:

wherein Cp is a single cyclopentadienyl or substituted cyclopentadienyl group optionally covalently bonded to M through a substituent, M is a Group VIA metal bound in a $\eta^5$ bonding mode to the cyclopentadienyl or substituted cyclopentadienyl group, X each occurrence is hydride or a moiety selected from the group consisting of halo, alkyl, aryl, aryloxy, alkoxy, alkoxyalkyl, amidoalkyl, and siloxyalkyl having up to 20 non-hydrogen atoms and neutral Lewis base ligands having up to 20 non-hydrogen atoms or optionally one X together with Cp forms a metallocycle with M and n is dependent upon the valency of the metal.

7. The method of claim 5, wherein the metallocene is represented by the general formula:

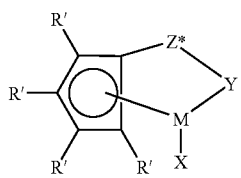

wherein:
R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is a neutral $\eta^4$ bonded diene group having up to 30 non-hydrogen atoms, which forms a π-complex with M;

Y is —O—, —S—, —NR*—, —PR*—,

M is titanium or zirconium in the +2 formal oxidation state;

Z* is $SiR^*_2$, $CR^*_2$, $SiR^*_2SiR^*_2$, $CR^*_2CR^*_2$, $CR^*=CR^*$, $CR^*_2SiR^*_2$, or $GeR^*_2$, wherein:
R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system.

8. The method of claim 1, wherein the activator is an aluminoxane or a borane.

9. The method of claim 1, wherein the activator has the formula:

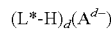

wherein
L* is a neutral Lewis base
$(L^*-H)^+_d$ is a Bronsted acid
$A^{d-}$ is a non-coordinating compatible anion having a charge of d⁻, and d is an integer from 1 to 3.

10. The method of claim 9, wherein the anion comprises a boron metal.

11. The method of claim 9, wherein the activator comprises a cation and an anion and wherein the anion has at least one substituent comprising a moiety having an active hydrogen.

12. The method of claim 1, wherein the activator comprises (i) an organoaluminum compound and (ii) an organoboron compound.

13. The method of claim 12, wherein the activator comprises a trialkylaluminum compound and a triarylboron compound.

* * * * *